United States Patent [19]

Kilian

[11] 3,989,485

[45] Nov. 2, 1976

[54] PROCESS AND APPARATUS FOR SCRUBBING EXHAUST GAS FROM CYCLONE COLLECTORS

[75] Inventor: Rodolfo G. Kilian, Mexico City, Mexico

[73] Assignee: Intensa, S.A., Mexico City, Mexico

[22] Filed: Feb. 7, 1975

[21] Appl. No.: 548,106

Related U.S. Application Data

[63] Continuation of Ser. No. 396,831, Sept. 13, 1973, abandoned.

[52] U.S. Cl. ................................. 55/90; 55/238; 55/260; 55/457; 55/459 R; 55/92; 261/79 A
[51] Int. Cl.² .......................................... B01D 47/06
[58] Field of Search ............................ 55/235–238, 55/240, 241, 260, 456, 457, 459, 90, 92; 261/79 A, 111

[56] References Cited

UNITED STATES PATENTS

| | | | |
|---|---|---|---|
| 1,009,963 | 11/1911 | Gamblin | 261/111 |
| 1,110,868 | 9/1914 | Bauer | 261/79 A |
| 2,259,033 | 10/1941 | Fisher | 55/235 |
| 2,587,416 | 2/1952 | Vedder | 55/235 |
| 3,518,817 | 7/1970 | Dewagnese | 55/257 X |
| 3,526,082 | 9/1970 | Thuillier | 261/112 X |

*Primary Examiner*—Frank W. Lutter
*Assistant Examiner*—David L. Lacey
*Attorney, Agent, or Firm*—Leydig, Voit, Osann, Mayer & Holt, Ltd.

[57] ABSTRACT

A scrubber for use with a cyclone collector having a vortex finder through which the collected exhaust gas containing fine particles flows vertically in a rapidly swirling vortex. As the vortex exits from the vortex finder in the cyclone collector, it passes radially outwardly through a parallel plate diffuser into a scrubber housing which has a diameter substantially larger than that of the vortex finder and which extends down over the exit end of the vortex finder. As the vortically flowing exhaust gas vortex passes through the parallel plate diffuser, still having a high tangential velocity, a liquid spray is introduced into the larger diameter vortex to trap fine particles in the exhaust stream, with a baffle means disposed over the end of the vortex finder blocking the entry of the liquid spray into the vortex finder. The liquid droplets and the fine particles trapped therein impinge on the suface of the scrubber housing, due to the relatively great mass of the liquid droplets, and then run or drop down onto the bottom wall of the housing and on out through a drain opening. The cleansed exhaust gas continues to swirl upwardly through the scrubber housing and is discharged through an exhaust duct.

6 Claims, 4 Drawing Figures

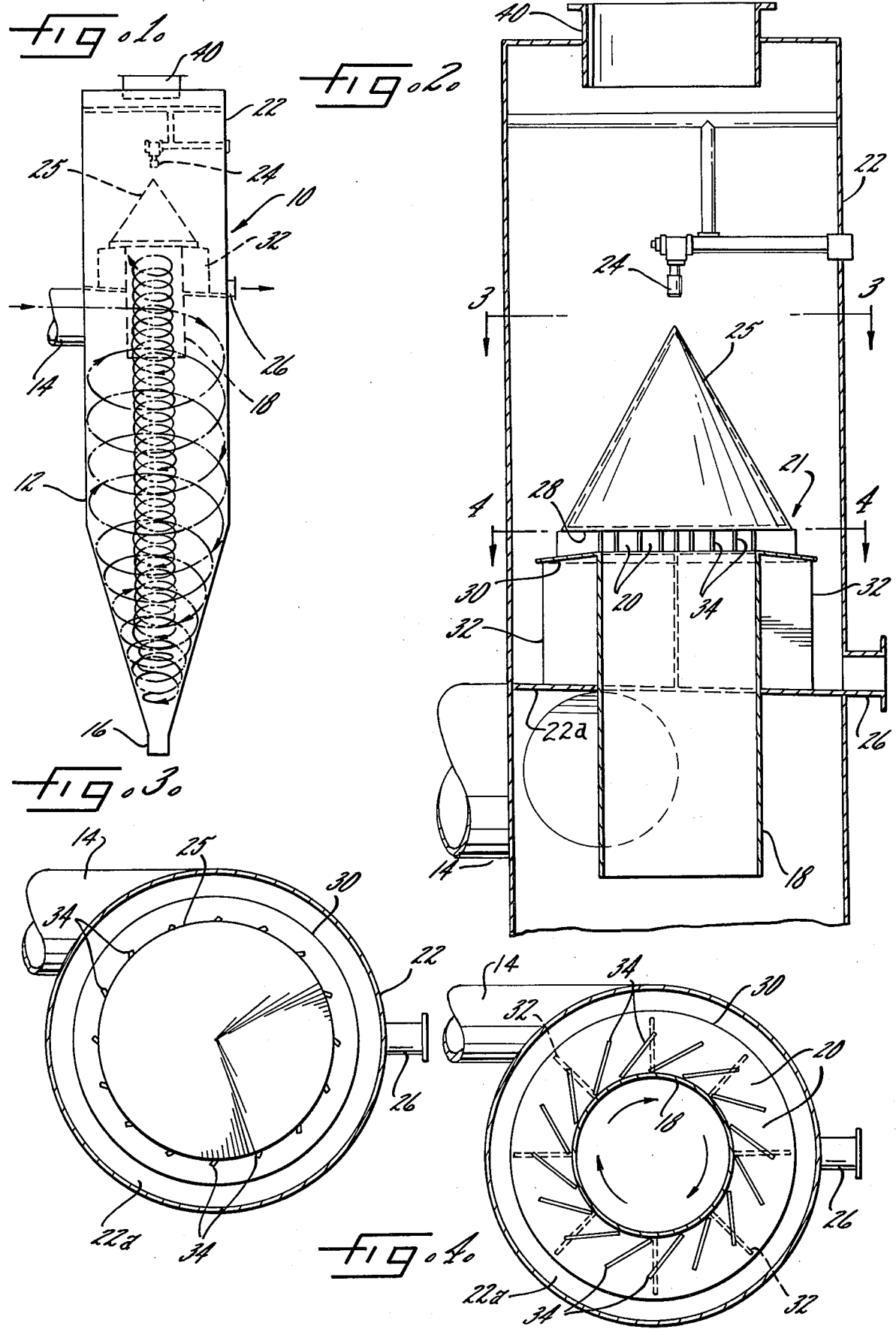

PROCESS AND APPARATUS FOR SCRUBBING EXHAUST GAS FROM CYCLONE COLLECTORS

This is a continuation of application Ser. No. 396,381, filed Sept. 13, 1973 now abandoned.

DESCRIPTION OF THE INVENTION

The present invention relates generally to cyclone collectors and, more particularly, to an improved scrubbing process and apparatus for removing fine particles from the exhaust gas from a cyclone collector.

It is a primary object of this invention to provide an improved scrubbing process and apparatus for removing fine particles from the exhaust gas from a cyclone collector in a highly efficient manner. Thus, a related object of the invention is to provide such an improved scrubbing process and apparatus which utilize the energy already available in the exhaust vortex of a cyclone collector to assist in the removal of fine particles from the exhaust gas.

Another object of the invention is to provide an improved scrubbing process and apparatus of the foregoing type which are economical from the standpoint of equipment requirements, and which permit the scrubber to be fabricated as an integral part of the exit end of the cyclone collector.

A further object of the invention is to provide such an improved scrubbing process and apparatus which are extremely effective in removing fine particles from the collector exhaust gas, and which produce a relatively low pressure drop in the process stream.

Other objects and advantages of the invention will be apparent from the following detailed description and the accompanying drawings, in which:

FIG. 1 is a side elevation of a cyclone collector equipped with a scrubber embodying the invention, with the pattern of fluid flow through the collector illustrated schematically in broken lines;

FIG. 2 is an enlarged vertical section taken through the middle of the upper portion of the cyclone collector and the scrubber of FIG. 1;

FIG. 3 is an enlarged section taken along line 3—3 in FIG. 2;

and FIG. 4 is a section taken along line 4—4 in FIG. 2.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention.

Turning now to the drawings and referring first to FIG. 1, there is shown a particle collection system 10 comprising a cyclone collector 12 having an inlet duct 14 for tangentially introducing particle-laden gas into the collector, a particle outlet 16 and a vortex finder 18 through which the exhaust gas from the collector flows. The pattern of gas flow through the cyclone collector 12 is schematically illustrated in FIG. 1 and is shown to comprise two counter current flows — an outer spiral flow downwardly through the collector and an inner rapidly swirling vortex flow upwardly through the collector.

Still referring to FIG. 1, particle separation from the gas stream is effected when the particles strike the walls of the cyclone collector 12, and such particles are then removed through the outlet 16. However, while the efficiency of particle separation can be quite high in cyclone collectors, there frequently are substantial quantities of very fine particles whose mass is not great enough to result in their being hurled against the cyclone wall before they are caught up in the inner swirling vortex flow upwardly through the collector. These fine particles, which during upward flow in the vortex achieve a high tangential velocity, are then exhausted from the collector 12 through the vortex finder 18.

In accordance with one important aspect of the present invention, the diameter of the collector vortex is increased as it leaves the vortex finder, and a liquid spray is introduced into the larger diameter vortex to trap the fine particles remaining in the exhaust stream, while blocking entry of the liquid spray into the vortex finder. The trapped particles are then removed from the vortex by impingement of the liquid droplets on a cylindrical surface around the outer periphery of the vortex. Thus, in the illustrative embodiment of FIGS. 1–4, the vortex emerging from the vortex finder 18 flows radially outwardly through lateral passageways 20 of a parallel plate diffuser 21 into a scrubber housing 22 having an inside diameter larger than that of the vortex finder 18 and extending downwardly over a substantial portion of the exit end of the vortex finder. As the vortex emerges from the lateral passageways 20, it is contacted by a pressurized liquid spray from a central spray nozzle 24, which may be a conventional hollow cone nozzle. This nozzle 24 discharges the liquid in a conical spray pattern extending downwardly and outwardly from the nozzle 24. Any liquid that might be discharged into the central region of the housing 22 is also deflected downwardly and outwardly by a conical member 25 mounted on top of the diffuser 21, thereby also providing an upwardly expanding passageway for the exhaust vortex above the diffuser 21.

Impingement of the rapidly moving, low mass particles in the vortex with the slower-moving, higher-mass liquid droplets in the spray from nozzle 24 causes the fine particles to be trapped or engulfed by the liquid droplets so that the particles can be removed from the exhaust stream by simply removing the liquid droplets therefrom. This removal of the liquid droplets, along with the entrapped fine particles, is effected by impingement of the liquid droplets on the wall of the scrubber housing 22, where the droplets coalesce and run or drop down to the bottom wall 22a of the housing 22 and then out through a drain 26. As can be seen in FIG. 2, the bottom wall 22a is sloped toward the drain 26 to prevent the liquid from standing on any portion of the bottom wall. Of course, the fine particles trapped in the collected liquid are removed from the housing 22 via the drain 26 along with the liquid.

It will be appreciated that the liquid droplets that enter the vortex in the scrubber housing 22 are caught up in the rapidly swirling flow of the vortex. However, because of the relatively great mass of the liquid droplets, as compared with the exhaust gas, the liquid droplets are rather quickly centrifuged outwardly through the vortex and against the walls of the housing 22. To ensure efficient entrapment of fine particles in the liquid droplets and removal of the liquid droplets from the vortex, it is desirable to maintain the tangential velocity of the vortex as high as possible within the scrubber housing 22; consequently, it is important to minimize losses within the parallel plate diffuser 21 that interconnects the vortex finder 18 and the scrubber housing 22.

The parallel plate diffuser 21 is formed by an arresting disc 28 spaced above the exit end of the vortex finder 18 to arrest the vertical flow of the vortex as it exits from the finder 18, and an annular plate 30 extending around the periphery of the exit end of the vortex finder 18. The arresting disc 28, which has a diameter substantially larger than that of the vortex finder 18, also serves as a baffle to block the entry of liquid into the vortex finder 18. To support the plate 30, a plurality of support members 32 extend downwardly from the plate 30 to the bottom wall 22a of the housing 22, while the disc 28 is supported on the plate 30 by means of a plurality of vanes 34. The support members 32 also function as baffles in the lower portion of the housing 22 to disrupt any hurricane type action in that region, thereby preventing the creation of a mist or the like which would adversely affect the operation of the scrubber.

As can be seen in FIG. 4, the vanes 34 are inclined away from the radii of the disc 28 and plate 30, in the direction of rotation of the vortex, so that the gas stream can flow radially outwardly into the housing 22 without any significant impingement of the fine particles on the vanes. This orientation of the vanes 34 also prevents splash back into the vortex finder 18. In the illustrative embodiment of the invention, the plate 30 slopes downwardly so that any liquid falling thereon flows to the outer edge of the plate and falls to the bottom of the housing 22, thereby preventing the liquid from flowing into the cyclone collector. However, this design is a slight departure from the optimum design for maximizing the tangential velocity of the vortex. Thus, in order to maintain the maximum tangential velocity of the vortex as it passes through the parallel plate diffuser, the diffuser is preferably designed in accordance with recognized principles of conservation of tangential velocity so that $$t = \frac{Fc/Tv}{Pv} = \frac{Fc}{Tv\ Pv}$$

where $t$ is the length of the vertical space between the diffuser plates 28 and 30, $Fc$ is the volumetric flow rate through the cyclone collector, $Tv$ is the tangential velocity of the vortex at the output of the vortex finder 18, and $pv$ is the perimeter of the vortex. The flow rate $Fc$ is generally known along with the tangential velocity $Tc$ of the downward spiral flow in the collector 12, and the tangential velocity $Tv$ of the vortex can be determined from the formula $$Tv = \frac{Tc\ Dc}{Dv}$$

where $Dc$ and $Dv$ are the diameters of the collector and the vortex, respectively. For example, if $Tc$ is 4000 ft./min., $Dc$ is 62 in. and $Dv$ is 31 in., $$Tv = \frac{4000 \times 62}{31} = 8000\ \text{ft./min.}$$

This theoretical value of $Tv$ must be corrected for losses due to friction, which might typically be 3000 ft./min., so that $Tv$ is actually 5000 ft./min. Then if the known values of $Fc$ and $Pv$ are 10,000 ft.³/min. and 8.1 ft., respectively, $$t = \frac{10,000}{8,000 \times 8.1} = 0.154\ \text{ft.}$$

at the periphery of the vortex finder 18. At the periphery of the plate 28, $t$ would be smaller because of the greater vortex perimeter. Thus, if the perimeter of the plate 28 is, for example, 9.2 ft., $$t = \frac{10,000}{8,000 \times 9.2} = 0.136\ \text{ft.}$$

at the periphery of the plate 28.

As the scrubbed exhaust gas swirls upwardly through the housing 22, it is discharged through an outlet 40 located in the top of the housing above the spray nozzle 24. Of course, this outlet 40 is located sufficiently far above the diffuser 21 and the spray nozzle 24 that substantially all the liquid is removed from the gas vortex before it reaches the outlet.

As can be seen from the foregoing detailed description, this invention provides a highly efficient process and apparatus for removing fine particles from the exhaust vortex of the cyclone collector by utilizing the energy already available in the vortex to assist in the particle removal. The scrubber can be easily constructed as an integral part of the exit end of the cyclone collector at a relatively low cost. Because the scrubbing liquid is introduced at a point where the exhaust vortex still has a high tangential velocity, the scrubber is extremely effective in removing fine particles from the exhaust gas, and yet it produces only a small pressure drop in the process stream.

I claim as my invention:

1. The combination comprising a scrubber and a cyclone collector having a vortex finder through which the collected exhaust gas containing fine particles flows vertically in a rapidly swirling vortex, said scrubber comprising the combination of a cylindrical scrubber housing having an inside diameter larger than that of the vortex finder, said scrubber surrounding the exit end of the vortex finder for receiving the vortex as it exits from the finder and allowing the diameter of said vortex to increase, means disposed adjacent the exit end of said vortex finder for substantially preserving the tangential velocity of the particles as the gas passes from the vortex finder into the scrubber housing, spray means disposed adjacent said tangential velocity preservative means for introducing a liquid spray of droplets into the scrubber housing in a manner such as to trap the particles in the exhaust stream in said droplets, the inside walls of said scrubber housing forming an impingement surface for collecting the liquid spray and trapped particles impinging on said surface, drain means cooperating with said scrubber housing for removing from the scrubber the liquid and trapped particles collected on said scrubber housing, exhaust means for discharging the cleansed exhaust stream from the scrubber, and baffle means arranged within said scrubber housing for blocking the entry of said liquid spray into said vortex finder.

2. A scrubber as set forth in claim 1 wherein said spray means includes a spray nozzle positioned centrally within the said scrubber housing.

3. A scrubber as set forth in claim 1 wherein said tangential velocity preservative means and said baffle means include a disc spaced from the exit end of the vortex finder and having an outside diameter greater than the inside diameter of the vortex finder for blocking the entry of liquid spray into the vortex finder.

4. A scrubber as set forth in claim 3 wherein said tangential velocity preservative means also includes an annular plate extending radially outwardly from the exit end of said vortex finder so as to cooperate with said disc to form a parallel plate diffuser for conducting said vortex radially outwardly from the exit end of the vortex finder.

5. The combination comprising a scrubber and cyclone collector having a vortex finder through which the collected exhaust gas containing fine particles flows vertically in a rapidly swirling vortex, said scrubber comprising, in combination, parallel plate diffuser means adjacent the exit end of the vortex finder for substantially preserving the tangential velocity of the particles as the gas exits from the vortex finder said parallel plate diffuser means including a disc spaced from the exit end of the vortex finder for arresting the gas flow in the vertical direction and an annular plate extending radially outwardly from the exit end of the vortex finder and below said disc to provide a space, means forming a chamber surrounding the disc and spaced from the periphery thereof and defining an impingement surface, spray means adjacent said annular plate for introducing a liquid spray of droplets in the space between the impingement surface of the chamber and the periphery of said disc for trapping particles in the exhaust gas in said droplets by impingement with the liquid spray, means in the lower portion of said chamber for removing said liquid and the particles trapped therein from said chamber, and an outlet in the upper portion of said chamber for removing the scrubbed exhaust gas from said chamber.

6. A process for scrubbing the exhaust gas from a cyclone collector having a vortex finder through which the collected exhaust gas containing fine particles flows vertically in a rapidly swirling vortex, said process comprising the steps of increasing the diameter of said vortex as it leaves the exit of said vortex finder while substantially preserving the tangential velocity of the particles contained therein, continuously introducing a liquid spray of droplets into the larger diameter vortex to trap particles in the exhaust stream in the droplets while blocking entry of the liquid spray into the vortex finder, providing an impingement surface around the outer periphery of the larger diameter vortex and continuously collecting the liquid spray and trapped particles impinging on said surface, and removing the collected liquid and trapped particles from said impingement surface and said vortex.

* * * * *